United States Patent [19]

Cole

[11] 4,376,549

[45] Mar. 15, 1983

[54] MECHANICAL MUSCLE ELEMENT

[76] Inventor: Howard W. Cole, 12 Vale Dr., Mountain Lakes, N.J. 07046

[21] Appl. No.: 173,689

[22] Filed: Jul. 30, 1980

[51] Int. Cl.³ .......................................... F16L 27/00
[52] U.S. Cl. .................................... 285/114; 285/227
[58] Field of Search ............... 285/226, 227, 228, 299, 285/114

[56] References Cited

U.S. PATENT DOCUMENTS

| 2,713,503 | 7/1955 | Ekholm | 285/226 X |
| 2,832,613 | 4/1958 | Farrar et al. | 285/226 |
| 3,061,039 | 10/1962 | Peters | 285/228 X |
| 3,834,741 | 9/1974 | Drake | 285/226 |

FOREIGN PATENT DOCUMENTS

| 2017494 | 5/1971 | Fed. Rep. of Germany | 285/226 |
| 709941 | 5/1931 | France | 285/226 |
| 725839 | 2/1932 | France | |
| 866411 | 5/1941 | France | 285/226 |
| 1182077 | 1/1959 | France | 285/226 |
| 903314 | 8/1962 | United Kingdom | 285/226 |

Primary Examiner—Thomas F. Callaghan
Attorney, Agent, or Firm—Hopgood, Calimafde, Kalil, Blaustein & Judlowe

[57] ABSTRACT

The axially flexible metal fluid coupling, illustrated by the drawing, consists of a convoluted thin wall tube sealed at each end to suitable fittings. The convoluted tube is very flexible and in itself does not appreciably contribute to the pressure capacity of the coupling. It is only a seal for the fluid and must be supported both radially and axially.

5 Claims, 4 Drawing Figures

MECHANICAL MUSCLE ELEMENT

BACKGROUND AND SUMMARY OF INVENTION

The invention relates to an axially flexible metal fluid coupling of the type wherein a convoluted thin-wall tube is sealed at each end to suitable fittings. The convoluted tube is only a seal for the fluid and must be supported both radially and axially.

The radial support is provided by rings, preferably coined and located between each convolution of the coupling. These rings are installed before the convolutions are formed in the tubing and become an integral part of the coupling. They support each convolution at its smallest radial dimension so that internal pressure produces only tension forces in the thin wall material. Since the convolutions are not subject to compressive or collapsing forces, a given wall thickness will carry much higher internal pressures than would be possible without the rings.

The convoluted tube is unique in that there are two different convolution sizes. A series of small convolutions is followed by a large convolution; this sequence is repeated throughout the length of the coupling. The large rings which support each large convolution have arms which extend longitudinally to engage with adjacent large rings. Two large rings, so connected, become what will be referred to as a "clip unit". Each clip unit constitutes a cage which has no relative motion between its parts if the coupling is made in such a way that the fluid pressure in the coupling does not either increase the length of the coupling or decrease its length.

Each clip unit combines two large convolutions and one series of small convolutions. Also, the clip units are interlocked in such a way that a large convolution is between each adjacent interlocked pair of clip units. This construction is analogous to a simple link chain with a small fluid filled balloon separating each two adjacent links. If such a chain is connected between two fixed points, tension in each link will be proportional to the fluid pressure in the small balloons. All radial deflection of the hose occurs by the opening and closing of the convolutions within the cage of the section.

DESCRIPTION OF DRAWING

In the drawing, forming a part thereof, in which like reference characters indicate corresponding parts in all the views.

DESCRIPTION OF PREFERRED EMBODIMENT

Figure 1:
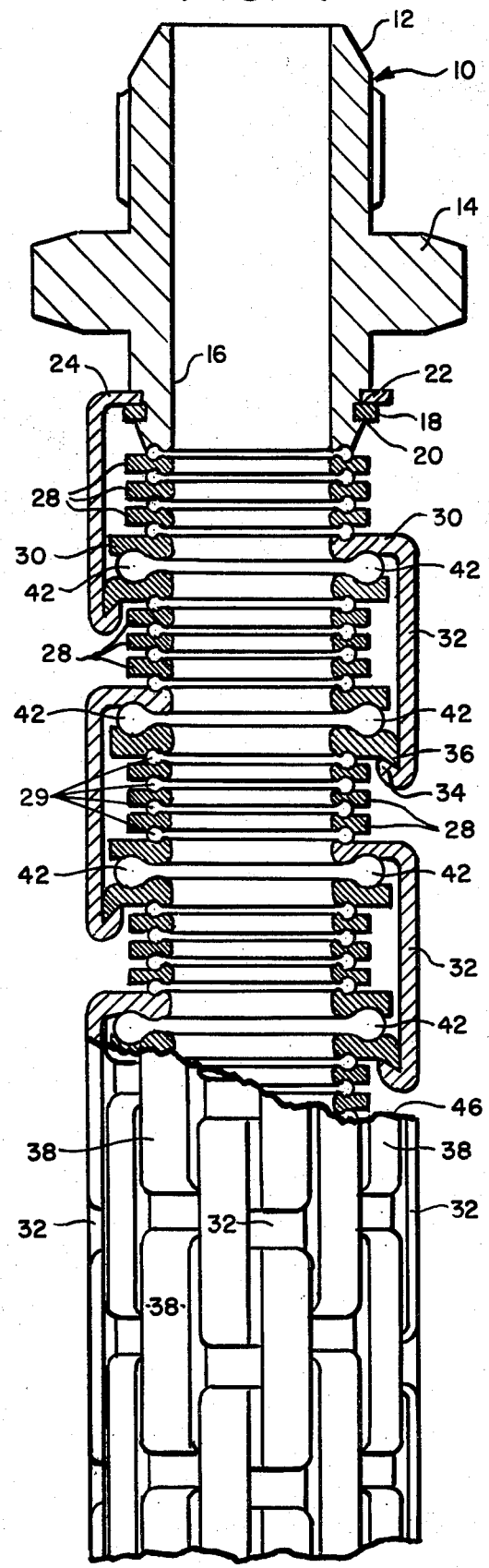
FIG. 1 is a side view, partly in section at one end of the fluid coupling and partly in elevation beyond the fourth clip unit; the other end of the fluid coupling is broken away and is not shown in the drawing.

FIG. 1 shows an end fitting 10 in section and strong enough to withstand the total fluid pressure to which the coupling may be subjected. The end face of the fitting 10 is made with a taper 12 which contacts with a complimentary taper of a pipeline in which the coupling of this invention is used. A hexagonal or octagonal flange 14 forms an integral part of the end fitting for the purpose of screwing the end fitting 10 to the pipeline with which it is used.

A thin wall tube 16 fits into the interior of the end fitting 10 and is welded to the inner surface of the fitting 10 so that it is an integral part of the fitting 10; but the length of the tubing 16 may not extend for the full length of the fitting 10 though it is shown as of that length in FIG. 1. Below the fitting 10, in section in FIG. 1, the thin wall tubing 16 which is cylindrical within the end fitting 10 is formed with convolutions that increase the diameter of the thin wall tubing 16 in a manner which will be explained. The end fitting 10 has a circumferential groove 18 into which a fixed ring 20 extends. There is another groove 22 which extends into the end fitting 10 around the entire circumference of the end fitting; and this groove 22 is engaged by hooks 24 which engage behind the ring 20, or the hooks 24 may be a continuous flange which is placed in position before the ring 20 is secured to the end fitting 10.

Beyond the end of the end fitting 10, at the bottom end as viewed in FIG. 1, three small rings 28 are placed around the outside of the thin wall tubing 16; each ring 28 extends into bottoming contact with the outward circumferential groove between adjacent small convolutions 29, and each ring 28 also uniformly contacts and supports adjacent side walls of the involved groove. Rings 28 are spaced apart from one another to the extent of the axially short radial outer limit of each involved convolution.

Figure 3:
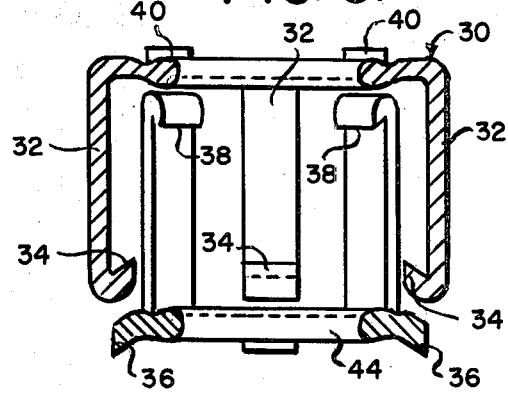
FIG. 3 is a sectional view taken on the line 3—3 of FIG. 2 but with the parts separated to show the shapes more clearly of FIG. 2.
Figure 4:
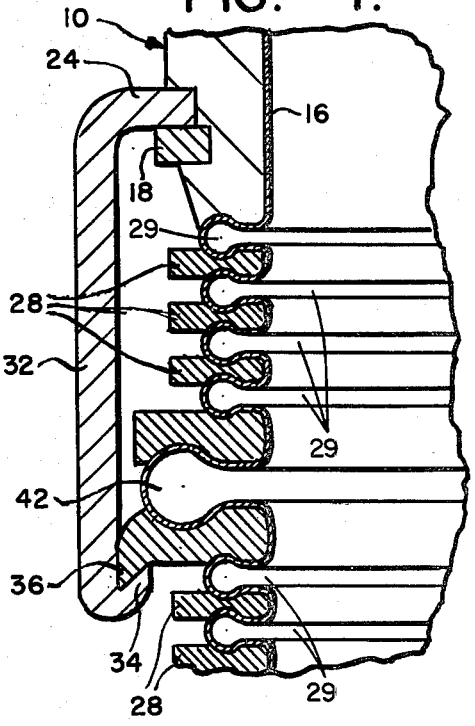
FIG. 4 is a greatly enlarged, fragmentary sectional view, similar to FIG. 1, but showing the first clip unit which is connected to the threaded coupling at the right hand end of FIG. 1.

Beyond the small rings 28, there is a large ring 30 with arms 32 extending from the ring 30 downward in FIG. 1 and have hooks 34 that engage with spring-clip action behind complimentary sloping faces 36. Midway between the complimentary faces 36 there are other hooks 38 (FIG. 3) that engage behind faces 40 on ring 30.

Figure 2:
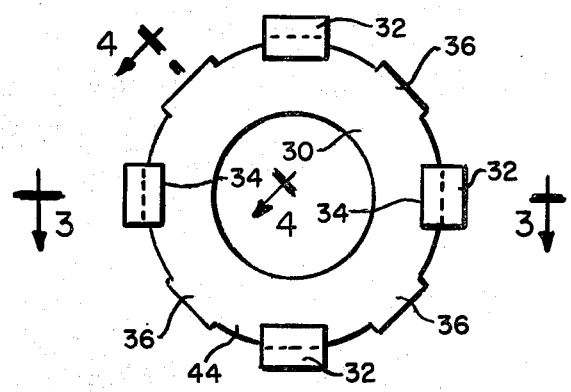
FIG. 2 is a transverse view showing the way in which certain hooks engage one of the large rings of FIG. 1.

In order to form the small convolutions 29 and the large convolutions 42, it is necessary to have a tight fitting plug within the thin wall tubing 16 so as to form a partition (not shown) across the tubing 16 at the end of each assembly of each large convolution and the plurality of spaced small convolutions that are on the upstream side of the large convolution. Fluid pressure is then applied via the end fitting 10 to the volume enclosed by the portion of the thin wall tubing between the end fitting to the volume enclosed by the plug partition. This pressure causes the thin wall tubing 16 to stretch and form small corrugations 29 in the spaces between small rings 28 and larter corrugations 42 in the larger space between the large rings. The pressure applied by the fluid and the amount by which the metal is stretched depends upon the clearance between the small rings and the adjacent structure and the clearance between the large rings. This can be computed if the clearance is known and the ultimate strength of the thin metal is also known. If the fluid coupling is not too long, all of the corrugations, both large and small, can be formed at the same time. When all of the corrugations are to be formed simultaneously, it is important to maintain the entire length of the fluid coupling at a uniform temperature. Axially connected rings 30 and 44 are shown in FIG. 2 with the hooks 34 engaged over the complimentary faces 36; but in FIG. 3 the rings 30 and 44 are moved apart axially for better illustration of the shape of the parts.

The lower fraction of FIG. 1, viz. below the line 46, shows in elevation a portion of the described structure. The construction appears to be made up of a plurality of short arms 32 and 38. There are four arms 32 and four arms 38 per unit of longitudinal repetition. The circumferential spacing of arms from arms 38 is slightly greater than the width of these arms to enable independence of their function, and most of the surface of the corrugated tube is covered by the arms 32, 38, 32, 38 and 32, as indicated in the elevational portion of FIG. 1. Each hooked arm or clip, except the end clips, axially overlaps corresponding circumferentially adjacent clips on both sides, as shown in the lower portion of FIG. 1.

The force resulting from hydraulic pressure on each end fitting is equal to the pressure of the fluid times the area of the small convolutions. Since each side of each large convolution must support both the force from the adjacent small convolutions and the total of the forces in the area of a spring clip unit, the area of a large convolution must be twice the area of the corresponding small convolutions to provide equilibrium. In other words, if the area of the large convolution is exactly twice the area of the corresponding small convolutions, it is stable and the end fittings may be moved axially with respect to each other regardless of whether the fluid coupling is pressurized or not.

Since this construction is both radially and axially flexible independent of internal pressure, it can be deflected in all directions over large amplitudes and therefore a very short piece of tubing can replace a long "U" or loop necessary with conventional hose.

Ratios of the areas of large to small convolutions other than 2 to 1 will cause the coupling to either lengthen or shorten with application of internal pressure. (A mechanical muscle).

Another important advantage of this consideration is realized for applications involving vibration or sound isolation. There is no direct metallic path for sound to travel between the end fittings as each adjacent pair of clip units are completely isolated by a cushion of fluid in the large convolutions.

The most efficient fluid transfer device is a straight length of pipe considering the factors of weight of material, pressure, and volume of fluid transmitted. The coupling of this invention will permit use of interconnected lengths of straight pipe for many applications now requiring long lengths of heavy and expensive hose. Temperature and pressure limit the use of rubber and plastic hose in other applications requiring good fatigue life and high flexibility. Rubber and plastic can be used for this invention but the full advantages of the construction are only possible with thin metal.

All braid covered hose becomes inflexible at high pressure, as in the case of a fire hose for example. The axially flexible construction obtained with this invention in all directions irrespective of pressure is an outstanding advantage.

If the area of each of the large convolutions 42 in relation to that of each of the small convolutions 29 is greater than twice that of the small convolution 29, then the pressure of the fluid tends to increase the length of the coupling, but if the areas of the small convolution 29 are less than one half that of the large convolution then the pressure of the fluid in the passage tends to decrease the length of the coupling.

The preferred embodiment of the invention has been illustrated and described, but changes and modifications can be made and some features can be used in different combinations without departing from the invention as defined in the claims.

What is claimed is:

1. A mechanical muscle element, comprising an axially flexible convoluted circular tube having axially clustered pluralities of convolutions of first cross-sectional area between axially spaced convolutions of second cross-sectional area larger than said first area, first category rings in the spaces between first-area convolutions and radially inwardly confining the involved cluster of convolutions, second category rings in the spaces between each second-area convolution and the adjacent first-area convolution and radially inwardly confining the tube in each such space, first axially stiff interconnections between those second-category rings which enable said first interconnections to span at least two second-area convolutions and the cluster of first-area convolutions therebetween, and second axially stiff interconnections between those second-category rings which enable said second interconnections to span at least two second-area convolutions and the cluster of first-area convolutions therebetween, said first and second interconnections being in axial overlapping relation with opposite axial sides of the same second-area convolution, the effective sectional area of second-area convolutions being other than twice the effective sectional area of first-area convolutions, whereby changes in internal fluid pressure within said tube will induce related differential forces in a predetermined direction of change in the relative axial positioning of said first and second interconnections.

2. The muscle element of claim 1, in which said first axially stiff interconnections comprise axially extending hook elements integrally formed with one of its involved second-category rings and in hooked axially retaining engagement with its other involved second-category ring, and in which said second axially stiff interconnections comprise axially extending hook elements integrally formed with one of its involved second-category rings and in hooked axially retaining engagement with its other involved second-category ring, said respective hook elements being in angularly interlaced relation.

3. The muscle element of claim 1, in which one axial end of said tube is terminated in a rigid tubular connector element, and in which third axially stiff interconnections between a second-category ring and said connector element span at least the next-adjacent cluster of first-area convolutions and the next-adjacent second-area convolution.

4. The muscle element of claim 1, in which said tube is a single piece with plural clusters of first-area convolutions and plural second-area convolutions integrally formed therein.

5. The muscle element of claim 1, in which said rings of both categories confine said tube to substantially the same inner diameter at their associated spaces between convolutions.

* * * * *